(12) United States Patent
Chang et al.

(10) Patent No.: US 7,849,187 B2
(45) Date of Patent: *Dec. 7, 2010

(54) NETWORK STATUS DISPLAY DEVICE AND METHOD USING TRAFFIC PATTERN MAP

(75) Inventors: Beom Hwan Chang, Daejeon (KR); Jung Chan Na, Daejeon (KR); Geon Lyang Kim, Daejeon (KR); Dong Young Kim, Daejeon (KR); Jin Oh Kim, Daejeon (KR); Hyun Joo Kim, Seoul (KR); Hyo Chan Bang, Daejeon (KR); Soo Hyung Lee, Daejeon (KR); Seon Gyoung Shon, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 435 days.

This patent is subject to a terminal disclaimer.

(21) Appl. No.: 11/527,850

(22) Filed: Sep. 26, 2006

(65) Prior Publication Data

US 2007/0074288 A1 Mar. 29, 2007

(30) Foreign Application Priority Data

Sep. 28, 2005 (KR) .................. 10-2005-0090729
Dec. 1, 2005 (KR) .................. 10-2005-0116588

(51) Int. Cl.
*G06F 15/16* (2006.01)
(52) U.S. Cl. .................. 709/224; 709/223; 709/227
(58) Field of Classification Search .................. 709/224
See application file for complete search history.

(56) References Cited

U.S. PATENT DOCUMENTS 6,754,220 B1 * 6/2004 Lamberton et al. .......... 370/401
7,127,743 B1 * 10/2006 Khanolkar et al. ............ 726/23
7,363,656 B2 * 4/2008 Weber et al. .................. 726/23
2005/0193120 A1 * 9/2005 Taylor ........................ 709/227

FOREIGN PATENT DOCUMENTS

KR 10-2004-0072365 8/2004

OTHER PUBLICATIONS

Hyogon Kim et al "Real-time Visualization of Network Attacks on High-Speed Links,"; IEEE Network ; Sep./Oct. 2004; pp. 2-12.*
"Real-time Visualization of Network Attacks on High-Speed Links," by Hyogon Kim et al.; *IEEE Network* ; Sep./Oct. 2004; pp. 2-12.

* cited by examiner

*Primary Examiner*—Jeffrey Pwu
*Assistant Examiner*—Sulaiman Nooristany
(74) *Attorney, Agent, or Firm*—Blakely, Sokoloff, Taylor & Zafman LLP

(57) ABSTRACT

A network status display device using a traffic pattern map is provided. The device includes: a traffic feature extractor extracting a port number of a port having the maximum occupancy of micro-flows and macro-flows for each network address section and host address section with reference to traffic information collected by an external traffic information collector, calculating and storing an occupancy rate of the port; a traffic status display unit making a network traffic pattern map expressed by destination-source network addresses and a host traffic pattern map expressed by destination-source host addresses and displaying the port information stored in the traffic feature extractor on the network traffic pattern map and the host traffic pattern map; and a traffic anomaly determination unit determining whether a network status is abnormal with reference to the network traffic pattern map and the host traffic pattern map and detecting and reporting a harmful or abnormal traffic which causes the abnormal network status. The device can determine whether the anomaly deteriorating the network performance exists and can easily and quickly detect the harmful or abnormal traffic which causes the anomaly by the use of the port information of the port having the maximum occupancy of the micro-flows and the macro-flows for each network address section and each host address section.

13 Claims, 4 Drawing Sheets

NETWORK STATUS DISPLAY DEVICE AND METHOD USING TRAFFIC PATTERN MAP

CROSS-REFERENCE TO RELATED PATENT APPLICATION

This application claims the benefit of Korean Patent Application No. 10-2005-0090729, filed on Sep. 28, 2005, and Korean Patent Application No. 10-2005-0116588, filed on Dec. 1, 2005, in the Korean Intellectual Property Office, the disclosures of which are incorporated herein in their entirety by reference.

BACKGROUND OF THE INVENTION

1. Field of the Invention

The present invention relates to a network security system, and particularly, to network status display device and method using a traffic pattern map which facilitates recognizing a current network status by extracting and analyzing predetermined traffic features and displaying an abnormal or harmful traffic which deteriorates network performance.

2. Description of the Related Art

In general, an abnormal network status is displayed by using one of network traffic items such as network addresses, protocols, ports, and packets. It is difficult to detect a traffic anomaly for a predetermined service and to display massive data in real time. Since a displayed traffic status image or graph is very complex, additional analysis is needed to detect the anomaly of the corresponding traffic by software. Therefore, in conventional methods of displaying a harmful traffic, a manager has to determine the anomaly of a predetermined traffic. Accordingly, it takes much time for the manager to determine the anomaly, detect the harmful traffic causing the anomaly, and react against the abnormal status.

SUMMARY OF THE INVENTION

The present invention provides network status display device and method using a traffic pattern map which can facilitate recognizing a current network status by analyzing a harmful or abnormal traffic deteriorating the network performance by the use of a flow occupancy rate of the representative port having the maximum occupancy rate for each network/host address section by software and displaying the analysis result.

The present invention also provides a computer-readable recording medium having embodied thereon a computer program for the network status display method.

According to an aspect of the present invention, there is provided a network status display device using a traffic pattern map, the device including: a traffic feature extractor extracting a port number of a port having the maximum occupancy of micro-flows and macro-flows for each network address section and host address section with reference to traffic information collected by an external traffic information collector, calculating an occupancy rate of the port, and storing the port number and the occupancy rate as port information; a traffic status display unit making a network traffic pattern map expressed by destination-source network addresses and a host traffic pattern map expressed by destination-source host addresses and displaying the port information stored in the traffic feature extractor on the network traffic pattern map and the host traffic pattern map; a traffic anomaly determination unit determining whether a network status is abnormal with reference to the network traffic pattern map and the host traffic pattern map and detecting and reporting a harmful or abnormal traffic which causes the abnormal network status.

According to another aspect of the present invention, there is provided a network status display method using a traffic pattern map, the method including: (a) extracting a port number of a port having the maximum occupancy rate of micro-flows and macro-flows for each network address section and host address section with reference to traffic information collected by an external traffic information collector and calculating an occupancy rate of the port; (b) storing the port number and the occupancy rate as port information; (c) displaying the port information on a network traffic pattern map expressed by destination-source network addresses and a host traffic pattern map expressed by destination-source host addresses; and (d) determining whether a network status is abnormal with reference to the network traffic pattern map and the host traffic pattern map in (c) and detecting and reporting a harmful or abnormal traffic which causes the abnormal network status.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, a desirable embodiment according to the present invention will be described in detail with reference to the accompanying drawings.

Figure 1:
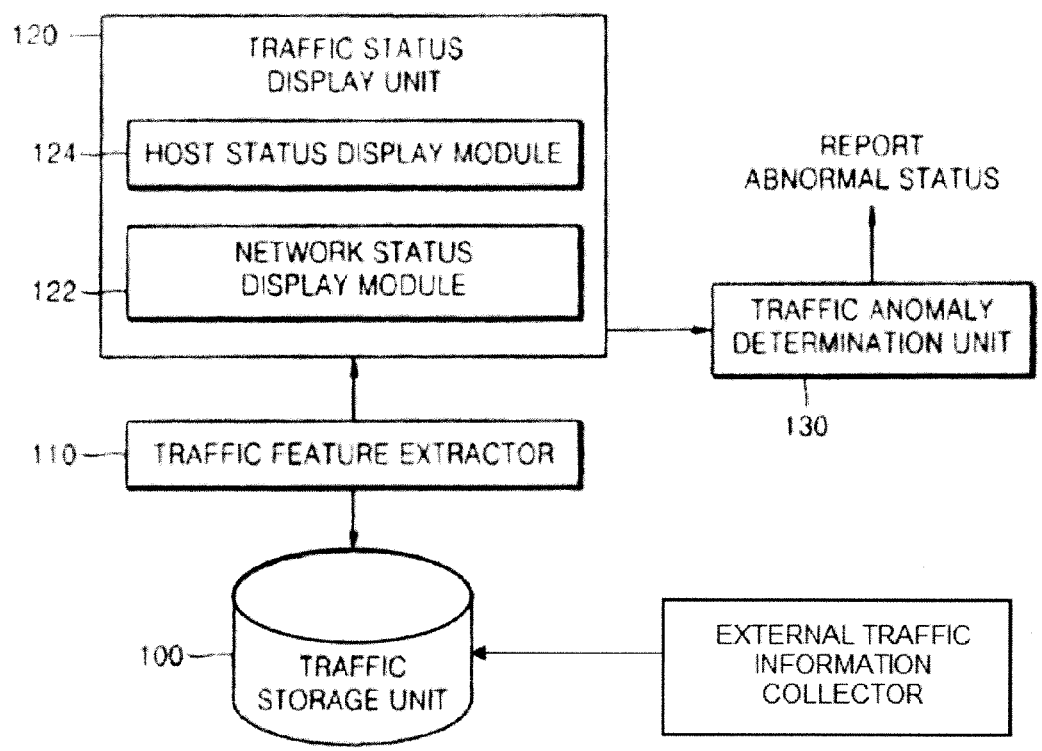
FIG. 1 is a block diagram showing a network status display device using a traffic pattern map according to the present invention.

FIG. 1 is a block diagram showing a network status display device using a traffic pattern map according to the present invention. The network status display device using a traffic pattern map includes a traffic feature extractor 110, a traffic status display unit 120, and a traffic anomaly determination unit 130.

Referring to FIG. 1, the traffic feature extractor 110 refers to traffic information which is collected by an external traffic information collector (not shown) and stored in a traffic information storage unit 100, if the total number of flows between a source and a destination for each network address section and each host address of the traffic is equal to or greater than M (M>0, in the embodiment M=100), and then the traffic extractor 110 extracts a port number of a port maximum occupancy of micro-flows and macro-flows, calculates an occupancy rate of the corresponding port, and stores the occupancy rate. If the total number of flows between a source and a destination is less than M, then the flows have no effect on network anomaly, so the total number of flows is limited to be equal to or greater than M. The micro-flow is the flow having connection duration less than predetermined reference connection duration (for example, 1 second), and the macro-flow is the flow having connection duration equal to or greater than predetermined reference connection duration. In case of a host address, an abnormal or harmful traffic can be determined by only some host addresses having high occupancy rate of the flow. Accordingly, the traffic feature extractor 110 extracts port numbers having maximum occupancy of the flow with respect to the top N (>0) host addresses having high occupancy rates, calculates occupancy rates of the extracted ports, and stores the occupancy rates.

The traffic status display unit 120 makes a network traffic pattern map expressed by the source and destination network addresses and a host traffic pattern map expressed by the source and destination host addresses and displays the port number of the port maximum occupancy rates of the flows and the occupancy rates which are calculated and stored in the traffic feature extractor 110 on the network traffic pattern map and the host traffic pattern map. Specifically, the traffic status display unit 120 includes a network status module 122 and a host status display module 124. At first, the network status display module 122 displays the occupancy rate of the port having maximum occupancy of the micro-flows and macro-flows calculated by the traffic feature extractor 110 on the traffic pattern map in which the transversal domain is divided into 26 destination network address sections (D0~D25) and the longitudinal domain is divided into 26 source network address sections (S0~S25). The host status display module 124 displays the occupancy rate of the port having maximum occupancy of the micro-flows and macro-flows calculated by the traffic feature extractor 110 on the traffic pattern map in which the transversal domain is divided into 26 destination network address sections and the longitudinal domain is divided into 26 source network address sections. The network status display module 122 and the host status display module 124 display ports in different colors to distinguish the ports. On the other hand, the traffic status display unit 120 displays an abnormal status which is generated by a worm attack, a service denial attack or a distributed service denial attack and a traffic which causes the abnormal status, through the traffic pattern map of the micro-flow, and detailed examples will be described with reference to FIGS. 2 to 4. A flash crowd and a peer to peer (P2P) congestion which are not abnormal statuses but cause network failures and a traffic which causes the aforementioned statuses are displayed in the traffic pattern map of the macro-flow. For example, in case of the flash crowd, a network/host traffic pattern map on which a predetermined number or more identical ports are displayed at a predetermined destination network address section and at a predetermined destination host address section along the longitudinal direction is generated. In case of the P2P congestion, a network/host traffic pattern map on which a predetermined port is displayed discretely at intersections of predetermined source network/host address sections and predetermined destination network/host address sections is generated.

The traffic anomaly determination unit 130 refers to the network traffic pattern map and the host traffic pattern map of the micro-flows and the macro-flows displayed by the traffic status display unit 120, determines whether a worm, a flash crowd, a P2P congestion, a service denial attack, or a distributed service denial attack exists, detects and reports the harmful or abnormal traffic which causes aforementioned abnormal statuses. The traffic anomaly determination unit 130 reports the worm attack, the service denial attack or distributed service denial attack and the traffic which causes aforementioned abnormal statuses by the use of the traffic pattern map of the micro-flow. The traffic anomaly determination unit 130 reports the flash crowd or the P2P congestion and the traffic which causes aforementioned abnormal statuses by the use of the traffic pattern map of the macro-flow.

As described above, the network status display device using the traffic pattern map can automatically perform: extracting the port number of the port having the maximum occupancy of the micro-flows and the macro-flows for each source/destination network address section and host address section and calculating the occupancy rate of the extracted port; making the network traffic pattern map expressed by the destination-source network addresses and the host traffic pattern map expressed by the destination-source host addresses; displaying the port number of the port having the maximum occupancy and the occupancy rate extracted from the traffic feature extractor 110 on the network traffic pattern map and the host traffic pattern map; and referring to the network traffic pattern map and the host traffic pattern map, determining whether the status is abnormal, detecting and reporting the harmful or abnormal traffic, by a program without the manager's manipulation. Accordingly, it is possible to watch a current network status faster and more quickly and react against the abnormal/harmful traffic automatically by program.

Figure 2:
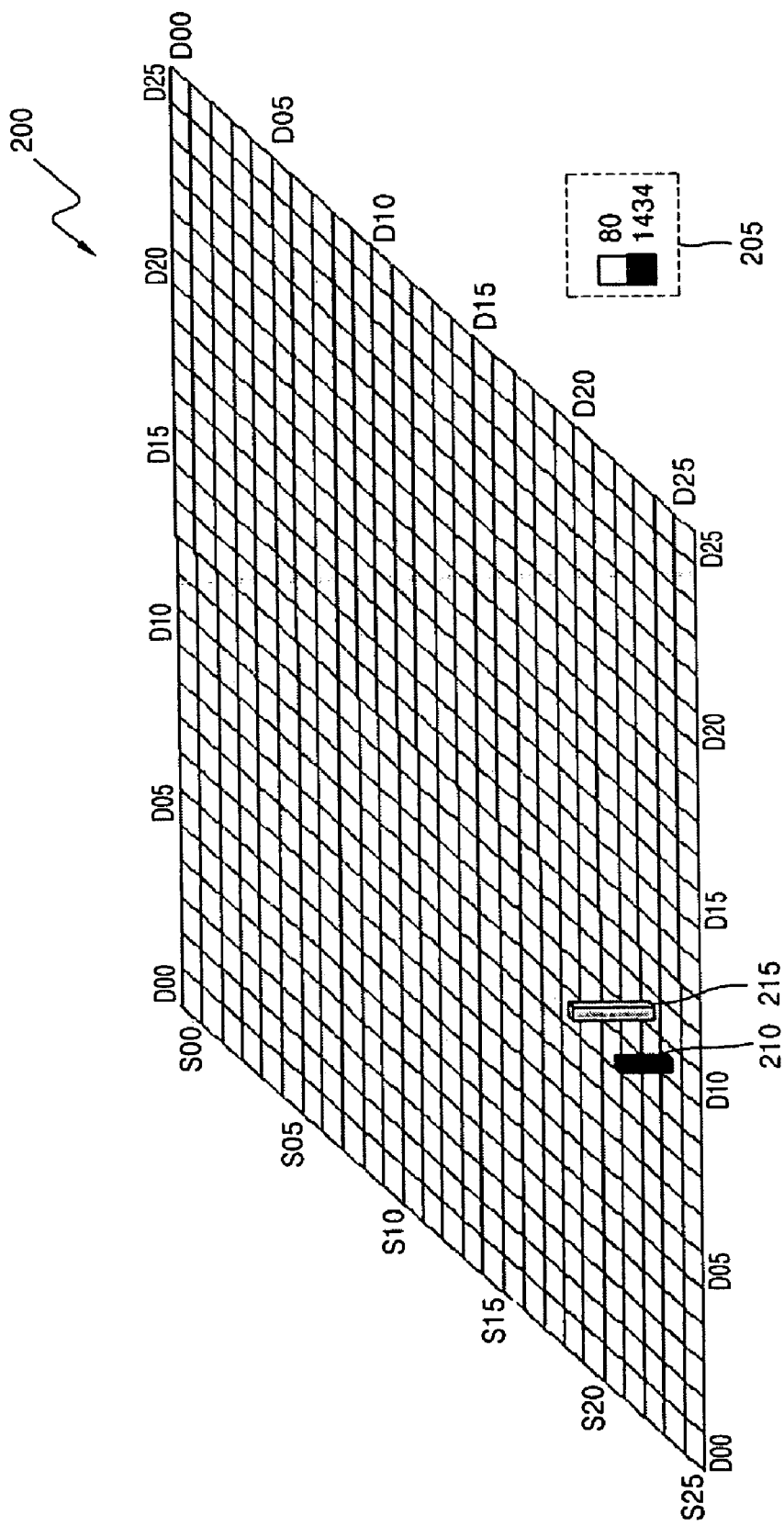
FIG. 2 shows a network traffic pattern map of micro-flows displayed on a network status display module shown in FIG. 1.

FIG. 2 is a view showing a network traffic pattern map of micro-flows displayed on a network status display module shown in FIG. 1 and shows an example of the network traffic pattern map in the normal state. In the network traffic pattern map 200 of the micro-flow, the longitudinal domain is divided into 26 source network address sections. For example, internet addresses are allocated like 0.0.0.0~9.255.255.255 (S), 10.0.0.0~19.255.255.255, . . . , 250.0.0.0~255.255.255.255 (S25). In the same way, the transversal domain is divided into 26 destination network address sections (D0~D25). The network traffic pattern map 200 of the micro-flows shown in FIG. 2 consists of 26×26 intersections, if the total number of flows between a source and a destination is equal to or greater than 100, and then the occupancy rate of the port having maximum occupancy is displayed on the intersections of the source traffic address sections and destination traffic address sections as a bar graph. The port number corresponding to the color of the bar graph is displayed at an index area 205.

In the network traffic pattern map shown in FIG. 2, the occupancy rate of the flow having the maximum occupancy rate among the micro-flows from the source network address section (S24, 240.0.0.0~249.255.255.255) to the destination network address section (D10, 100.0.0.0~109.255.255.255) and the micro-flows from the source network address section (S23, 230.0.0.0~239.255.255.255) to the destination network address section (D11, 110.0.0.0~119.255.255.255) is displayed on the intersections of the source traffic address sections and the destination traffic address sections as the bar graph which is colored according to the port number. That is, the flow is not centered at a predetermined destination or source network address section, so the network is in a normal status.

Figure 3:
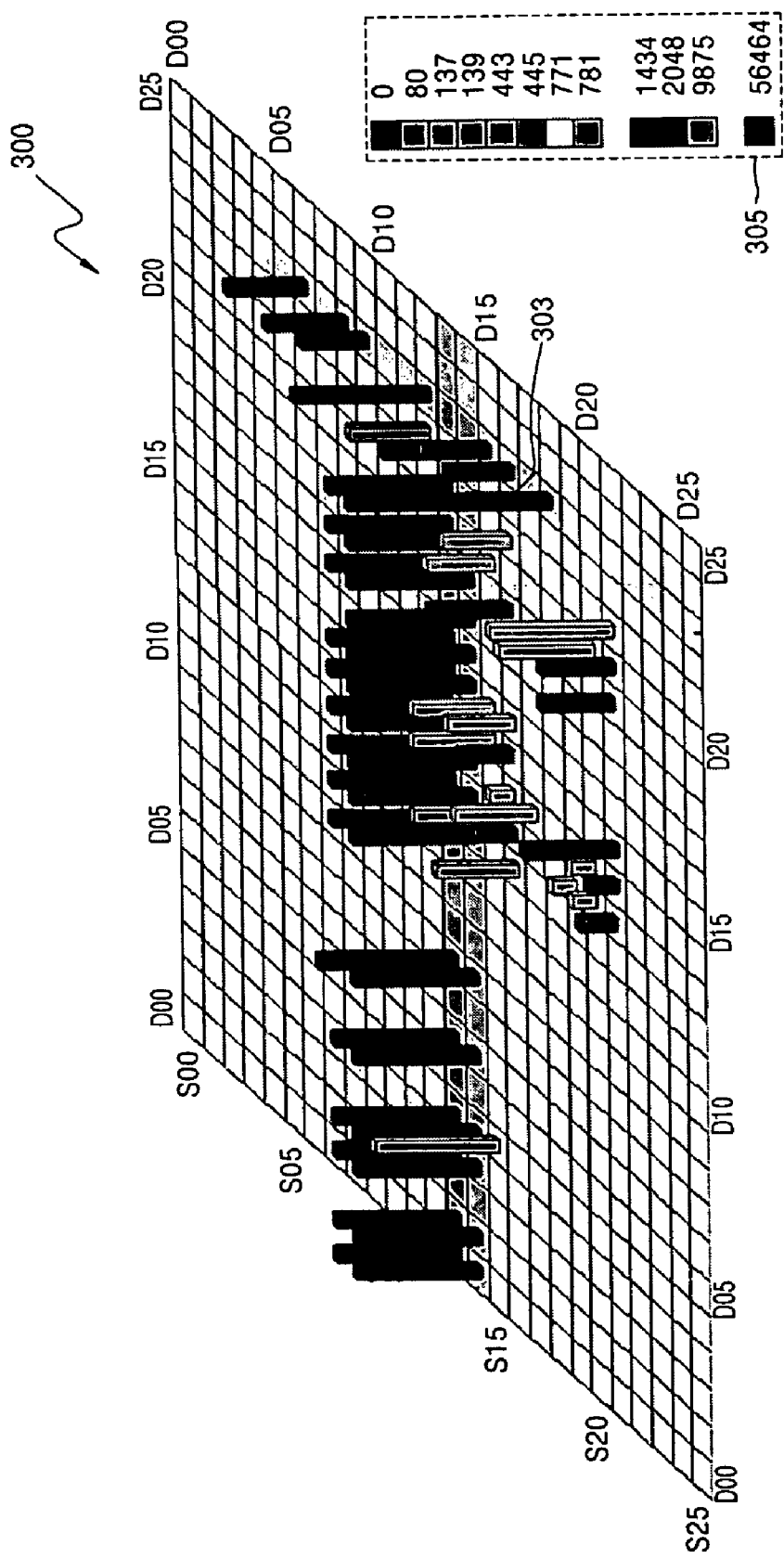
FIG. 3 shows a network traffic pattern map of micro-flows in an abnormal status.

FIG. 3 shows a network traffic pattern map of micro-flows in an abnormal status. The network traffic pattern map shown in FIG. 3 shows a case where the plurality of traffic flows from the source network address sections S13 and S14 to the arbitrary destinations using the predetermined port occur, that is, FIG. 3 shows the internet worm attack using the predetermined port. Referring to the index table 305, the port number used in the worm attack is 1434. In addition, the distributed service denial attack using the predetermined port from the plurality of sources to the predetermined destination network address section D23 occurs, and the port number used in the distributed service denial attack is 56464 in reference to the index table 305. In order to more clearly visualize the abnormal status of the network traffic pattern map, a predetermined threshold value (for example 50%) is set so as to determine whether the occupancy rate of the port is abnormal, if the occupancy rate of the port having the maximum occupancy rate is equal to or less than the predetermined threshold value, and then the occupancy rate may not be displayed on the network traffic pattern map. In addition, if the number of the same ports in the same destination or same source network address section is greater than a predetermined threshold number (for example, 5), the corresponding source network address section or destination network address section may be colored by the color assigned to the corresponding port. If the predetermined source network address section is colored by the predetermined color in the network traffic pattern map, and then the traffic anomaly determination unit 130 can determine that the traffic anomaly is caused by the internet worm. If the predetermined destination network address section is colored by the predetermined color in the network traffic pattern map, and then the traffic anomaly determination unit 130 can determine that the traffic anomaly is caused by the distributed service denial attack. The traffic anomaly determination unit 130 reports the traffic anomaly together with the detailed information on the host which generates the traffic anomaly with reference to the host traffic pattern map. On the other hand, though the host traffic pattern map is not shown, the host traffic pattern map is generated like the network traffic pattern map, in which the transversal domain is divided into the N destination host address sections and the longitudinal domain is divided into the N source host address sections, and the specific host address can be displayed by displaying the specific port used for the attack on the host traffic pattern map.

Figure 4:
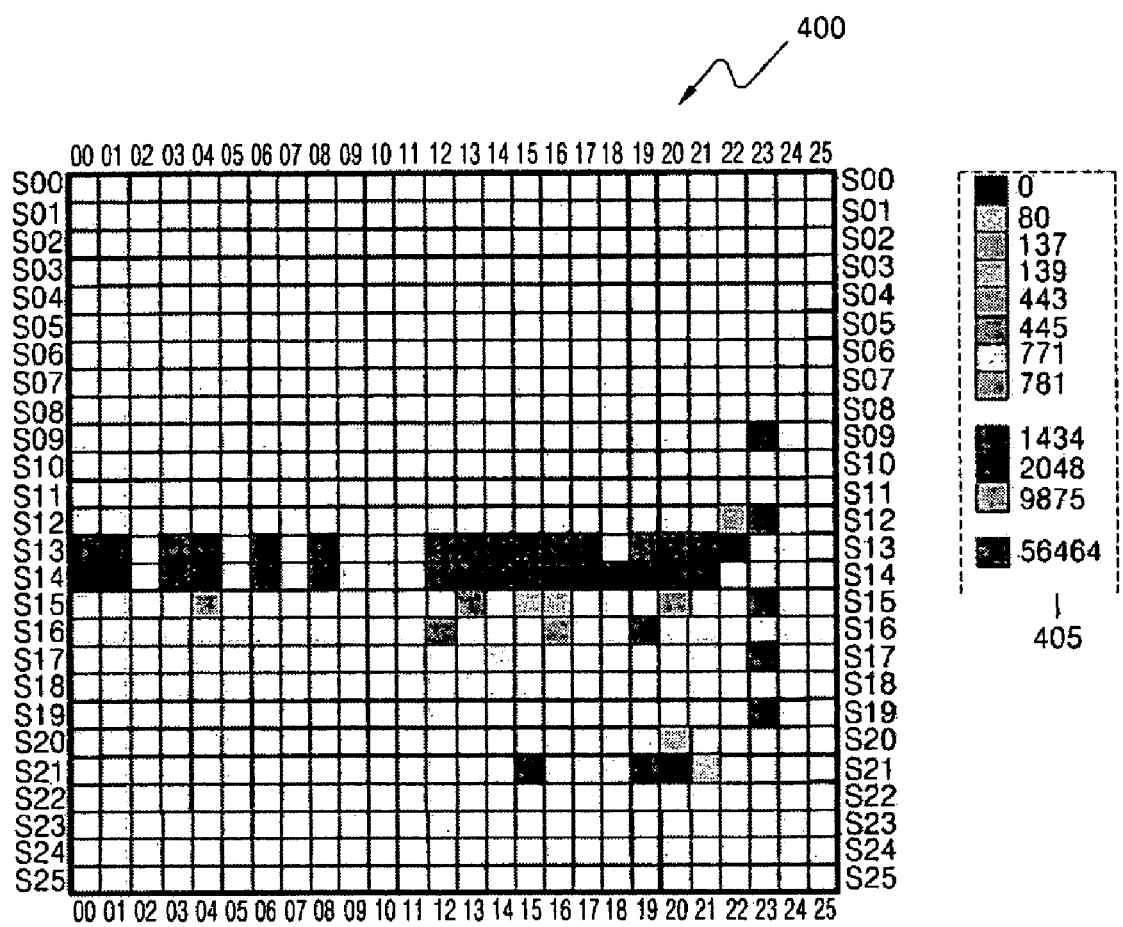
FIG. 4 shows another example of a network traffic pattern map of micro-flows in an abnormal status.

FIG. 4 shows another example of a network traffic pattern map of micro-flows in an abnormal status. FIG. 4 is a 2-dimensional view of 3-dimensional network traffic pattern map. The network traffic pattern map shown in FIG. 4 is analyzed like the network traffic pattern map shown in FIG. 3, and therefore the detailed description will be omitted.

As described above, network status display device and method using the traffic pattern map according to the present invention can determine whether the anomaly deteriorating the network performance exists and detect the harmful or abnormal traffic which causes aforementioned anomaly by the use of the information of the port having the maximum occupancy of the micro-flows and the macro-flows for each network address section and each host address section. In addition, the reaction against the abnormal state can be performed without the manager's manipulation by automatically performing these procedures by program. Since the network traffic pattern map and the host traffic pattern map visualize the anomaly and the information of the harmful or abnormal traffic which causes the anomaly, the manager can recognize and react against the abnormal status of the network quickly.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A network status display device using a traffic pattern map, the device comprising:

a traffic feature extractor extracting a port number of a port having the maximum occupancy of packet micro-flows and packet macro-flows for each network address section and host address section with reference to traffic information collected by an external traffic information collector, calculating an occupancy rate of the port, and storing the port number and the occupancy rate as port information, wherein micro-flows are those flows that exist for periods less than a predetermined time and macro-flows are those flows that exist for periods longer than the predetermined time, wherein the traffic feature extractor only stores the occupancy rates of N (N>0) host addresses with the highest occupancy rates;

a traffic status display unit making a network traffic pattern map expressed by destination-source network addresses and a host traffic pattern map expressed by destination-source host addresses and displaying the port information stored in the traffic feature extractor on the network traffic pattern map and the host traffic pattern map; and a traffic anomaly determination unit determining whether a network status is abnormal with reference to the network traffic pattern map and the host traffic pattern map of the packet micro-flows and the packet macro-flows displayed by the traffic status display unit and detecting and reporting a harmful or abnormal traffic which causes the abnormal network status;

wherein the traffic status display unit comprises: a network status display module generating the network traffic pattern map in which traffic information on the packet micro-flows and the packet macro-flows is displayed on a plane in which a transversal domain is divided into P (>0) destination network address sections and a longitudinal domain is divided into P (>0) source network address sections; and a host status display module generating the host traffic pattern map in which the traffic information on the packet micro-flows and the packet macro-flows is displayed on a plane in which a transversal domain is divided into destination host address sections and a longitudinal domain is divided into source host address sections.

2. The device of claim 1, wherein the traffic feature extractor extracts and stores the port information when the total number of packet flows between a source and a destination is equal to or greater than M (>0).

3. The device of claim 1, wherein the port information displayed on the network traffic pattern map and the host traffic pattern map is distinguished by assigning different colors to the port number.

4. The device of claim 1, wherein the port information is displayed on the network traffic pattern map and the host traffic pattern map when the occupancy rate of the port is greater than a predetermined threshold value for determining whether the network status is abnormal.

5. The device of claim 1, wherein when the number of ports having the same port number which are displayed in the same destination/source network address section and the same destination/source host address section is greater than a predetermined threshold number, the destination/source network address section and the destination/source host address section colored by the same color assigned to the corresponding port in the network traffic pattern map and the host traffic pattern map.

6. The device of claim 1, wherein the network traffic pattern map and the host traffic pattern map are 3-dimensional pattern maps in which the occupancy rate of the port number of the port having the maximum occupancy rate is displayed in a bar graph.

7. The device of claim 1, wherein the network traffic pattern map and the host traffic pattern map are 2-dimensional pattern maps in which the port information on the port number of the port having the maximum occupancy rate is displayed.

8. A network status display method using a traffic pattern map, the method comprising:
  (a) extracting a port number of a port having the maximum occupancy rate of packet micro-flows and packet macro-flows for each network address section and host address section with reference to traffic information collected by an external traffic information collector and calculating an occupancy rate of the port, wherein micro-flows are those flows that exist for periods less than a predetermined time and macro-flows are those flows that exist for periods longer than the predetermined time, wherein only the occupancy rates of N (N>0) host addresses with the highest occupancy rates;
  (b) storing the port number and the occupancy rate as port information;
  (c) displaying the port information on a network traffic pattern map expressed by destination-source network addresses and the host traffic pattern map expressed by destination-source host addresses; and
  (d) determining whether a network status is abnormal with reference to the network traffic pattern map and the host traffic pattern map of the packet micro-flows and the packet macro-flows in (c) and detecting and reporting a harmful or abnormal traffic which causes the abnormal network status;
  wherein (b) comprises: generating the network traffic pattern map in which the traffic information on the packet micro-flows and the packet macro-flows is displayed on a plane in which a transversal domain is divided into P destination network address sections and a longitudinal domain is divided into P source network address sections; and generating the host traffic pattern map in which the traffic information on the packet micro-flows and the packet macro-flows is displayed on a plane in which a transversal domain is divided into destination host address sections and a longitudinal domain is divided into source host address sections.

9. The method of claim 8, wherein in (a), the port information is extracted and stored when the total number of packets flows between a source and a destination is equal to or greater than M (>0).

10. The method of claim 8, wherein the port information displayed on the network traffic pattern map and the host traffic pattern map is distinguished by assigning different colors to the port number.

11. The method of claim 8, wherein the port information is displayed on the network traffic pattern map and the host traffic pattern map when the occupancy rate of the port is greater than a predetermined threshold value for determining whether the network status is abnormal.

12. The method of claim 8, wherein when the number of ports having the same port number which are displayed in the same destination/source network address section and the same destination/source host address section is greater than a predetermined threshold number, the destination/source network address section and the destination/source host address section are colored by the same color assigned to the corresponding port in the network traffic pattern map and the host traffic pattern map.

13. The method of claim 8, wherein the network traffic pattern map and the host traffic pattern map are 3-dimensional pattern maps in which the occupancy rate the port number of the port having the maximum occupancy rate is displayed in a bar graph or 2-dimensional pattern maps in which the port information on the port number of the port having the maximum occupancy rate is displayed.

* * * * *